Nov. 21, 1939.　　B. C. McFADDEN　　2,180,879
METHOD OF AND APPARATUS FOR FLATTENING SHEET MATERIAL
Filed Oct. 11, 1935　　2 Sheets-Sheet 2
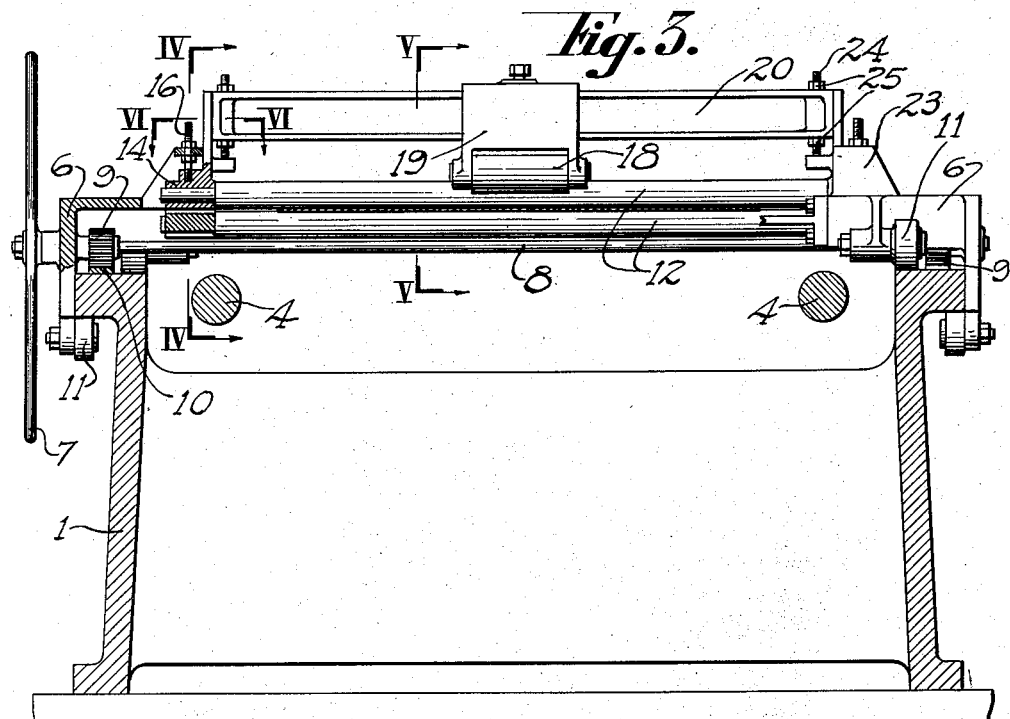
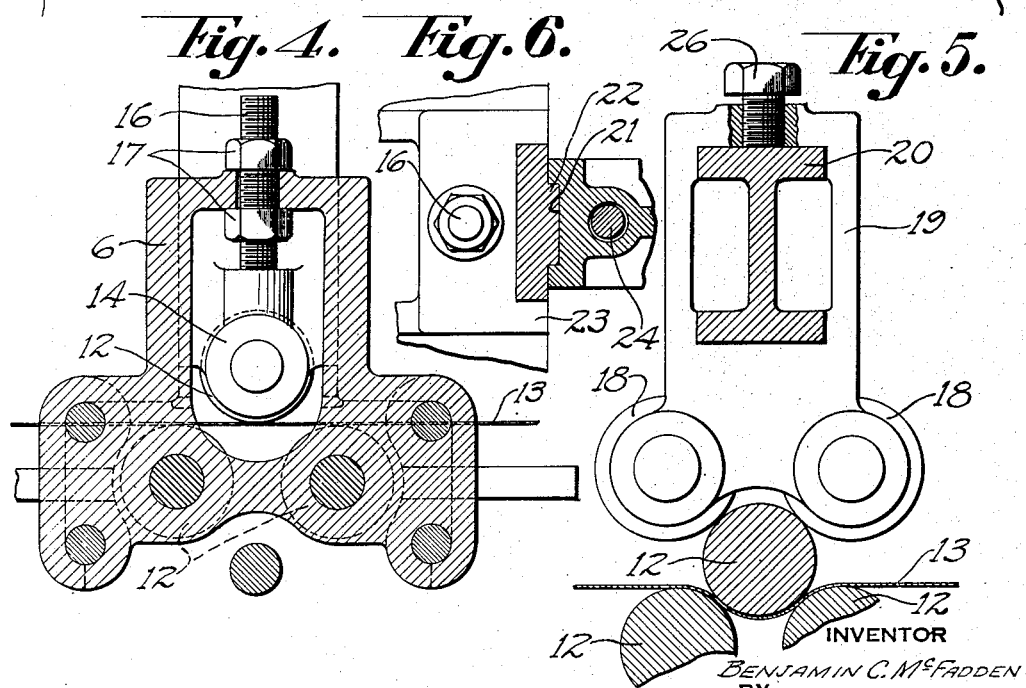
INVENTOR
BENJAMIN C. McFADDEN
BY
Donald W. Robertson
ATTORNEY Patented Nov. 21, 1939

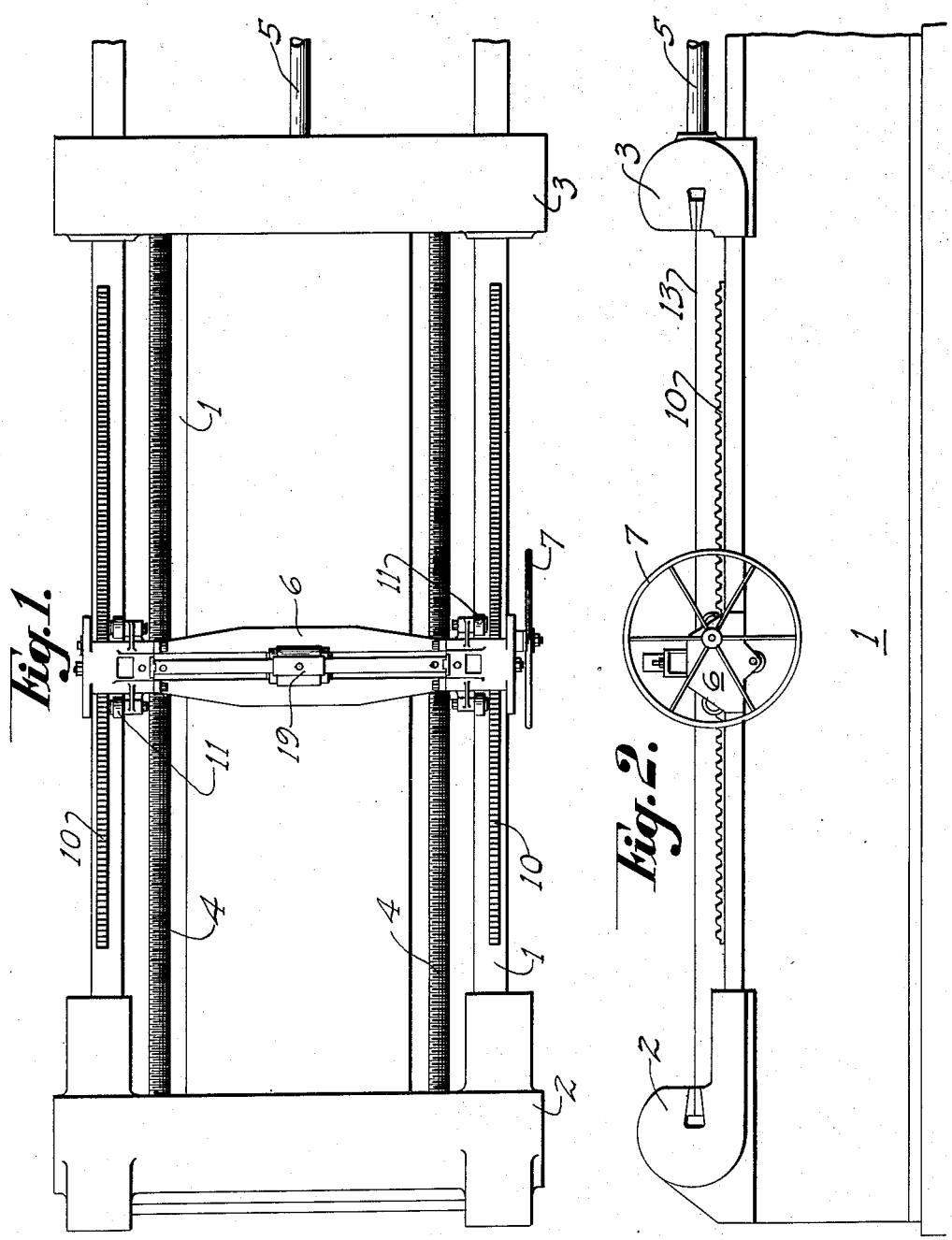

2,180,879

UNITED STATES PATENT OFFICE 2,180,879

METHOD OF AND APPARATUS FOR FLATTENING SHEET MATERIAL

Benjamin C. McFadden, Pittsburgh, Pa., assignor to Aluminum Company of America, Pittsburgh, Pa., a corporation of Pennsylvania Application October 11, 1935, Serial No. 44,537

3 Claims. (Cl. 153—32)

This invention relates to apparatus for and a method of leveling or flattening strip or sheet metal. The method and apparatus are particularly applicable to the production of flat sheet of great width as compared to the thickness or gauge.

Sheet material as delivered from a rolling mill in which it has been subjected to a reduction in gauge is often buckled or waved, necessitating a flattening operation in order to be commercially acceptable. Similarly, alloys of some metals, such as aluminum, are heat-treated after being reduced to sheet form, and after the heat-treating operation are badly warped due to temperature differential stresses set up during cooling.

Usually the material is flattened either by means of roller levelers or by stretching the material between suitable gripping devices. All of the flattening methods, including that of the present invention, are dependent upon exceeding the elastic limit of the warped or buckled material to obtain a state of partial plasticity. Flattening by means of stretchers and roller levelers of the usual forms presents disadvantages inherent in each method. In roller levelers it is necessary to subject the material being leveled to reverse curvature of sufficiently small radius to stress the material in excess of the elastic limit. In the leveling of relatively thin material this necessitates the use of leveling rolls of very small diameter. The rolls, if of any considerable length, must therefore be supported or backed up to prevent excessive deflection. In many cases it is entirely impractical, if not impossible, to construct levelers of this type for the thinner gauges of material when required in relatively great widths. Leveling by stretching is disadvantageous because the entire sheet must be stretched until every buckle is flattened out. This in many cases results in excessively stressed material in certain portions of the sheet. In stretching larger widths of sheet, much difficulty is encountered in obtaining a uniform grip on the sheet across the width of the gripping jaws, and unless uniformly gripped the sheet is likely to be torn from the jaws due to the biting action and the high tensile forces involved, or the sheet may be unevenly stretched across its width, resulting in the formation of longitudinal buckles.
The present method overcomes the deficiencies and difficulties encountered in the prior methods of leveling sheet products and is applicable to sheet of any gauge or width. It further gives a product having a high standard of flatness and having more uniform structural characteristics over the entire sheet area by eliminating the necessity for overstressing certain portions of the sheet in order to obtain the desired degree of flatness.

The method consists in placing the product to be leveled under definite tensile stress throughout the area to be leveled and subjecting this area to reverse bending forces. The method may be better illustrated by reference to the description of, and the accompanying drawings, in which:

Fig. 1 shows a plan view of a machine constituting an embodiment of the invention and suitable for the practice of the method;

Fig. 2 shows a side elevation of the same;

Fig. 3 shows an elevation, partially in section, taken transversely of the machine;

Fig. 4 shows a section taken along the line IV—IV of Fig. 3;

Fig. 5 shows a section taken along the line V—V of Fig. 3; and

Fig. 6 shows a section taken along the line VI—VI of Fig. 3.

Referring to the drawings, the reference numeral 1 indicates the base or frame of the machine, upon which are mounted suitable gripping heads 2 and 3. The gripping head 2 is adapted for movement along the frame 1 by the rotation of screws 4 working in suitable nuts (not shown) mounted integrally with the head to accommodate various lengths of sheet material. After being located in proper position along the frame, head 2 remains fixed relative thereto during the operation of the machine. The gripping head 3 is adapted for movement along the base and is actuated by a suitable power source (not shown) acting through a member 5. The power source must be adequate to place the material to be flattened under tension.

A carriage 6 is mounted for movement along the frame intermediate the gripping heads. Positive movement of the carriage along the frame is effected by rotation of the hand wheel 7 mounted on shaft 8, to which are fixed gears 9 adapted to cooperate with the toothed racks 10 integrally attached to the frame. Suitable rollers 11 adapted to roll along the frame are provided to facilitate such movement.

A plurality of working rollers 12 are journalled in the carriage 6 and are adapted to engage the material to be flattened, represented by the reference numeral 13, when held at its extremities by the gripping heads. Preferably the roller above the material is provided with means for vertical adjustment with respect to the lower rolls, both to accommodate different gauges of material and to vary the degree of curvature imparted to the material when engaged by the rolls. To effect such adjustment the journals 14 of the upper roll are slidably mounted in carriage 6. By means of the studs 16, integral with the journals, and the cooperating nuts 17, the roll may be raised or lowered as desired.

To control accurately the deflection of the top roll, back-up rolls 18 are provided. These back-up rolls are mounted for rotation in the housing 19 mounted on the beam 20. The beam 20 is provided at the ends with grooves 21 cooperating in sliding relationship with the tongues 22 on the carriage brackets 23. Vertical adjustment controlling the extent of the deflection of the working roll is obtained by raising or lowering the beam by means of the studs 24, which are integral with the brackets, and the nuts 25.

Further control of the deflection of the working roll can be obtained by varying the position of the back-up rolls 18 along the beam 20. To this end the housing 19 is slidable along the beam and may be locked in the desired position by means of the set screw 26.

The operation of the machine is as follows. The material 13 to be flattened is threaded through the rollers 12 and the extremities gripped between the gripping heads 2 and 3. The sheet is then put under tension by applying power to the gripping head 3. The upper roll 12 is then lowered from the position shown in Fig. 4 to approximately the position shown in Fig. 5 by means of the studs 16 and the nuts 17. The carriage 6 is then moved longitudinally along the frame of the machine by means of the hand wheel 7, and the buckles are removed by the reverse bending action to which the rollers 12 subject them.

In some cases it is preferable that certain portions of the material be subjected to the flattening action of the rollers prior to applying any substantial tensile force by means of the gripping heads in order to effect a partial flattening, after which the tension is applied. In other cases it will be preferable to place the material under tension sufficient to effect a partial flattening before subjecting it to the action of the rollers. Badly buckled portions may then be subjected to the action of the rollers, after which tension is applied to complete the flattening operation. In all cases a superior flattening action can be obtained by the combination of tensile forces and the reverse bending stresses induced by the action of the rollers.

By utilizing the combination of these forces the necessity for the use of extremely small diameter bending rollers, such as are required in ordinary roller levelers, is eliminated, and the necessity for overstressing certain portions of the material in order to effect a complete flattening of other portions, as required in ordinary stretchers, is eliminated. The operation of the rollers may be limited to those portions of the material indicating the need for such working, and repeated working may be obtained by repeated movement of the carriage along the machine frame.

For some types of buckling it is often preferable to subject certain portions of the width of the sheet to a greater degree of reverse curvature than other portions. For example, if it is desired to stretch the middle of the sheet more than the edges, one or more of the working rolls may be deflected toward the sheet at its center. This may be accomplished in the apparatus shown by increasing the pressure of the back-up rolls against the upper roll 12. By the provision of a suitable number of such back-up rolls it is possible to obtain a wide variety of deflection curves of the working rolls. Such back-up rolls can be applied to the top rolls or the lower rolls as desired, and any number of working rolls may be employed, providing that at least one reverse curve is induced in the material by their co-action.

In the description of my invention I have shown a relatively simple machine for manual operation. It is apparent that suitable power means may be utilized for obtaining the pressure on the working rolls, for obtaining longitudinal movement of the carriage with respect to the sheet, and for performing various other functions connected with the operation. Such mechanisms are sufficiently well known in the art to require no elaboration in order to adapt their operation to the control of the machine of my invention. Various changes in detail and arrangement may be made without departure from the spirit and scope of the appended claims.

I claim:

1. In a machine for flattening sheet material, means for gripping the material at spaced intervals, means mounted for movement between said gripping means including a plurality of working rollers for subjecting said material to reverse bending stresses while under tension applied through said gripping means, and means for controlling the flexure of said working rollers including back-up rollers adjustable longitudinally of said working rollers and adapted for vertical adjustment for varying the pressure exerted thereon.

2. In a machine for flattening sheet material, means for gripping the material at spaced intervals, a plurality of working rollers mounted for movement between said gripping means for applying pressure to said material and subjecting said material to reverse bending stresses while under tension applied through said gripping means, means for independently adjusting either end of a working roller relative to the rollers associated therewith, back-up rollers for controlling the flexure of said working rollers, supporting means for said back-up rollers, means for adjusting said back-up rollers longitudinally of said working rollers on said supporting means, and means for adjusting said supporting means transversely of said working rollers, adjacent either end thereof, whereby each back-up roller may be adjusted to act on and conform with the portion of the working roller which it engages.

3. The method of flattening sheet material which comprises gripping the material at spaced intervals, applying tensile stress to the material between the spaced intervals, applying pressure and reverse bending across the width and over portions of the length of the material under tensile stress, and varying the magnitude of pressure and reverse bending at different points across the width of the material.

BENJAMIN C. McFADDEN.